No. 659,560. Patented Oct. 9, 1900.
D. W. TIETJEN.
ICE CYCLE.
(Application filed Dec. 4, 1899.)
(No Model.) 2 Sheets—Sheet 1.
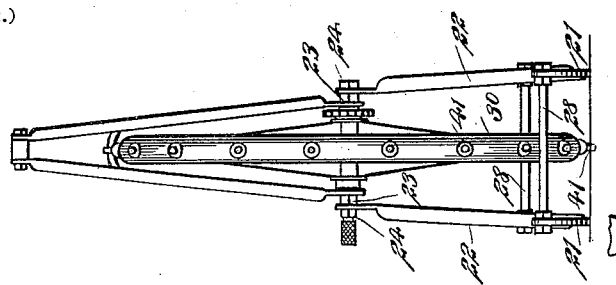
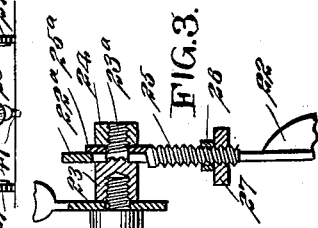
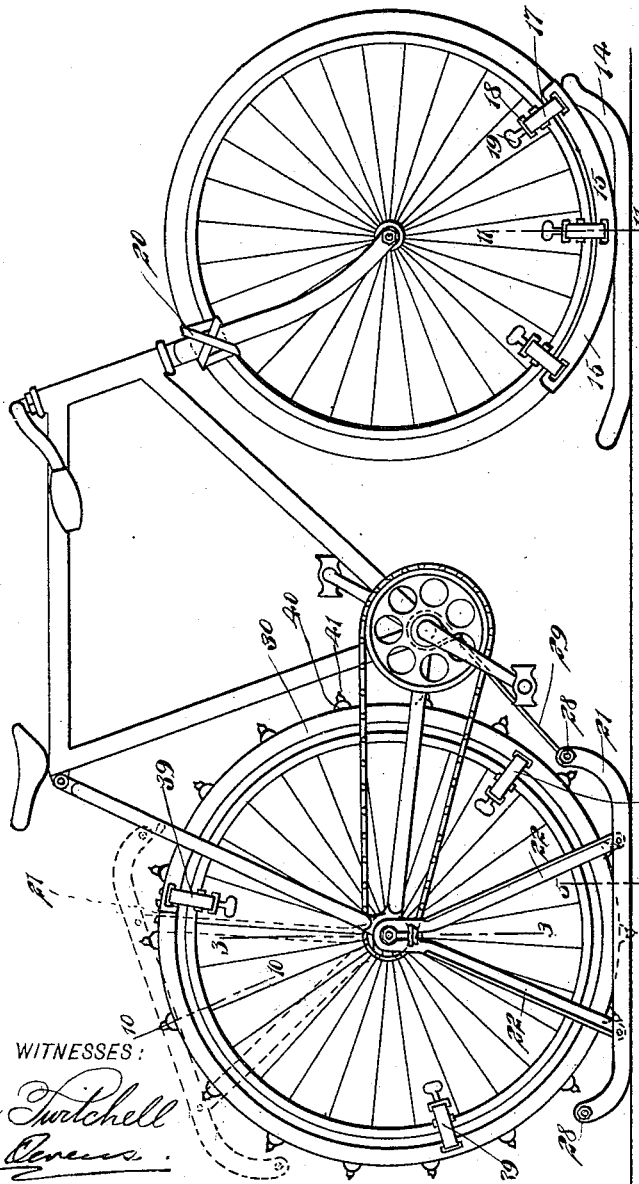
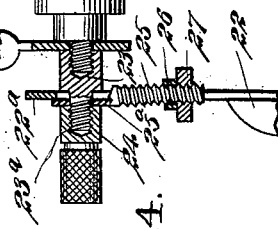
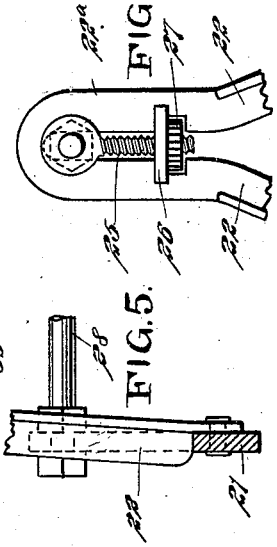
WITNESSES:
INVENTOR
D. W. Tietjen
BY
ATTORNEYS No. 659,560.
D. W. TIETJEN.
ICE CYCLE.
(Application filed Dec. 4, 1899.)
Patented Oct. 9, 1900.
(No Model.)
2 Sheets—Sheet 2.
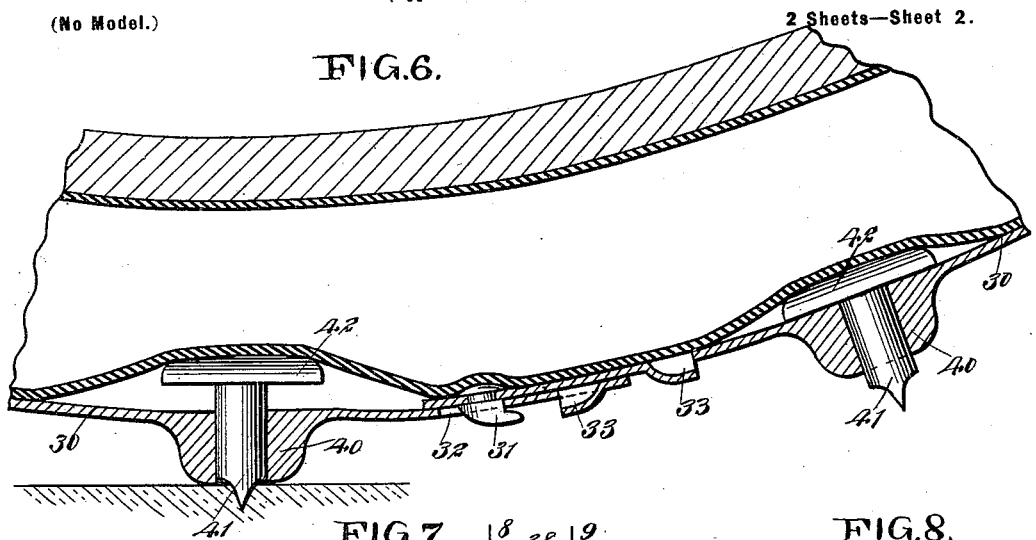
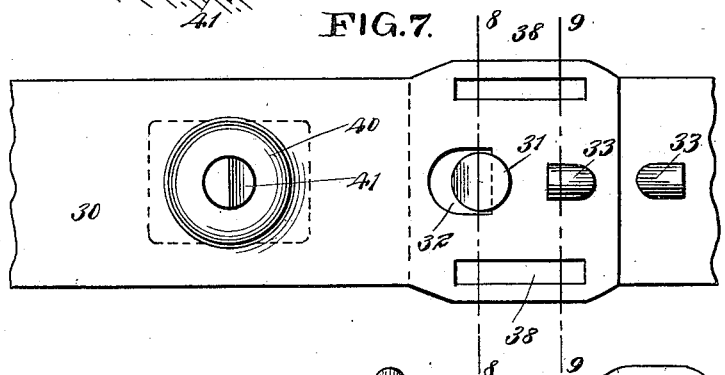
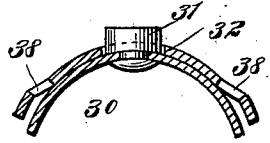
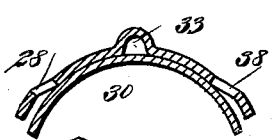
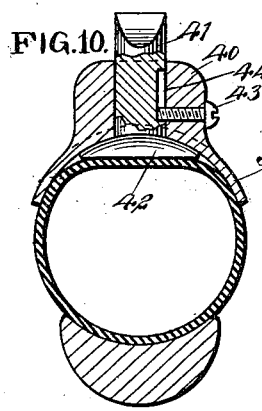
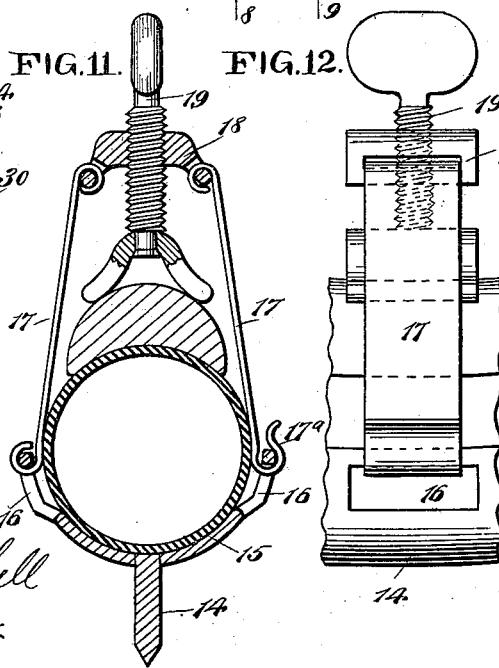
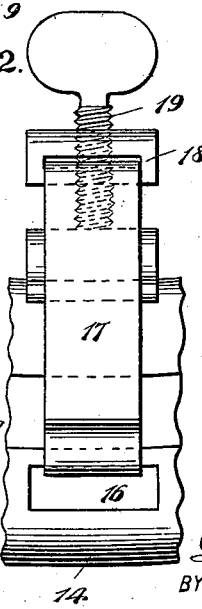
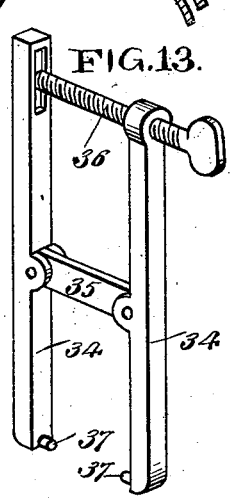
WITNESSES:
Donn Twitchell
J. B. Cevens
INVENTOR
D. W. Tietjen
BY
Munn
ATTORNEYS

UNITED STATES PATENT OFFICE.

DIETRICH WILLIAM TIETJEN, OF MILWAUKEE, WISCONSIN.

ICE-CYCLE.

SPECIFICATION forming part of Letters Patent No. 659,560, dated October 9, 1900.

Application filed December 4, 1899. Serial No. 739,142. (No model.)

*To all whom it may concern:*

Be it known that I, DIETRICH WILLIAM TIETJEN, a citizen of the United States, and a resident of Milwaukee, in the county of Milwaukee and State of Wisconsin, have invented a new and Improved Ice-Cycle, of which the following is a full, clear, and exact description.

The purpose of this invention is to provide superior attachments for bicycles, permitting them to be employed on ice, and to this end I provide detachable runners for raising the tires of the bicycle above the ice, and I also provide a detachable ice-rim for the rear or traction wheel of the bicycle, such rim being arranged to engage the ice to propel the bicycle thereon.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a side elevation of a bicycle having my improvements applied. Fig. 2 is a rear elevation thereof. Fig. 3 is a section on the line 3 3 of Fig. 1. Fig. 4 is an enlarged elevation of part of the means for securing the rear runners in place. Fig. 5 is a section on the line 5 5 of Fig. 1. Fig. 6 is a longitudinal section of the ice-rim, showing it in place. Fig. 7 is a plan view of the ice-rim. Fig. 8 is a section on the line 8 8 of Fig. 7. Fig. 9 is a section on the line 9 9 of Fig. 7. Fig. 10 is a section on the line 10 10 of Fig. 1. Fig. 11 is a section on the line 11 11 of Fig. 1. Fig. 12 is a side view of one of the clamps for holding the ice-rim in place, and Fig. 13 is a perspective view of a tool employed in placing and displacing the ice-rim.

For attachment to the front wheel of the bicycle I provide a single runner 14, (see Figs. 1 and 11,) which is rigidly connected with a socket-plate 15, and this plate is formed in each side edge with a number of orifices 16, in which are engaged the links 17 of clamping-heads 18. These clamping-heads are fitted with thumb-screws 19, which engage with the rim of the front wheel and by which the clamping-heads 18 may be forced inward, straining on the links 17 and securely holding the socket-plate 15 in the position shown. One of the links 17 in each clamp (see Fig. 11) is formed with a hook $17^a$, which removably engages the socket-plate, thus facilitating the ready emplacement and displacement of the clamps. When the runner 14 is applied to a bicycle, as shown in Fig. 1, the front wheel of the bicycle is held against revolution by a strap or other suitable lashing 20, engaged with the steering-fork, as shown in Fig. 1. This runner 14 therefore raises the front wheel out of contact with the ice and supports the same, so that the steering-fork may be directed to guide the bicycle.

For supporting the rear part of the bicycle I provide two runners 21, arranged one at each side (see Fig. 2) and each provided with stanchions 22, preferably constructed of angle-iron. The stanchions 22 extend upward and are connected with each other at their upper ends to form a loop $22^a$. These loops are connected with the rear axle of the bicycle, as shown in Fig. 3. Such connection is effected by means of nuts 23, which are screwed on the threaded ends of the rear axle in place of the usual nuts and which serve to hold the axle in place with relation to the frame of the bicycle, as Fig. 3 shows. The nuts 23 have threaded extensions $23^a$ at their outer ends, on which additional nuts 24 are mounted. Fitted snugly on each extension $23^a$ is the head $25^a$ of a screw 25. These screws 25 extend down inside of the respective loops $22^a$ and loosely through cross-bars 26, rigidly attached to such loops, as shown. Nuts 27 work on the screws 25 below the cross-bars 26, and the loops $22^a$ of the stanchions 22 are extended over the extension $23^a$ of the nuts 23, the loops being permitted to slide relatively to such nuts 23, so that by operating the nuts 27 the screws 25 may be moved to adjust the position of the stanchions 22 relatively to the rear wheel of the bicycle. As shown in Fig. 4, the nuts 27 are set in recesses in the loops $22^a$, which arrangement enables the screws 25 to be moved up or down by the operation of the nuts 27, as explained. The two runners 21 are braced transversely by bars 28, extended between them and located, respectively, at the ends of the runners. From the front bar 28 a brace 29 extends forward to the crank-hanger of the bicycle to further strengthen the structure. This brace 29 is detachably connected with the crank-hanger in any suitable manner. It will be seen that by these means the rear runners 21 may be easily applied to and disengaged from the bicycle, and, if desired, by regulating the nuts 24 the runners 21 may be thrown up to the position shown by dotted lines in Fig. 1, in which position the rear wheel will be permitted to engage the ground and the runners 21 will not interfere with the operation of the bicycle in the ordinary manner. This enables the rear runners to be applied to the bicycle at a point distant from the ice-fields, permitting the user to ride to the ice-fields and saving the user the trouble of stopping at the ice-fields to apply the rear runners 21.

The ice-rim before referred to consists of a longitudinally-channeled flexible strap 30, preferably of steel, arranged to lie around the usual pneumatic tire of the rear wheel of the bicycle, as shown in Figs. 1, 6, and 10. The contiguous ends of the strap forming the ice-rim are joined to each other by a button 31, attached to one end and engaging in an orifice 32 in the other end. The ends of the ice-rim overlap, as shown, and may be drawn into locked position or moved from such position through the medium of a tool (shown in Fig. 13) working with lips 33, respectively formed on the ends of the ice-rim, preferably by striking up from the rim portions of the material composing the same. This tool (shown in Fig. 13) comprises jaws 34, respectively pivoted to the ends of a link 35. At one end the jaws 34 are provided with a screw 36 and at the other end with pins 37. The pins 37 are adapted to be engaged with the loops 33, and by working the screw 26 it will be seen that the necessary pressure may be applied to the ice-rim to effect the object in view. The ice-rim has its edges formed at various points with orifices 38, similar to the orifices 16 of the socket-plate 15, with which orifices are adapted to be engaged clamps 39, (see Fig. 1,) such clamps being similar to the clamps of the socket-plate 15 and serving to hold the ice-rim in place. The ice-rim 30 is formed with a number of openings therein, which are surrounded by bosses 40, and in these bosses are slidably fitted spurs 41, the outer ends of which are pointed to engage the ice (see Fig. 6) and the inner ends of which are provided with heads 42, which bear against the pneumatic tire of the bicycle-wheel, as shown. For limiting the movement of the spurs 41 and the bosses 40 I provide each boss with a screw or pin 43, (see Fig. 10,) which screws respectively fit in grooves 44, formed in the spurs, as shown. The resiliency of the pneumatic tire which is engaged with the spurs 41 of the bosses 40, as well as the air-pressure within the tire, causes the spurs 41 to be normally thrown outward, as shown at the right in Fig. 6; but when the spurs are engaged with the ground the weight which is placed on the spurs will cause them to yield inward against the tire, as shown at the left in Fig. 6, the spurs at the same time engaging with the ice in such a way as to prevent the slipping of the ice-rim. The pressure of the tire on the spurs will cause them to be very firmly engaged with the ice, at the same time permitting the spurs to yield sufficiently to avoid jarring the rider and also to avoid undue straining of the parts of the device.

Having thus described my invention, I claim as new and desire to secure by Letters Patent—

1. An attachment for velocipedes, having a runner, a socket-plate mounted rigidly thereon and formed with orifices in its side edges, and a clamp comprising links engaged with the orifices, a clamping-head to which the links are attached, and a thumb-screw working in the clamping-head, by which to hold the socket-plate in place.

2. An attachment for velocipedes, comprising a nut adapted to be engaged with an axle of the velocipede and having an extension, a nut working on such extension, a stanchion having a loop mounted to slide between the nuts, a screw fitted on the extension of the first-named nut, an additional nut mounted to turn in the loop and engage with the screw to adjust the loop of the stanchion, and a runner carried by the stanchion.

3. A flexible rim adapted to encircle vehicle-wheels, one end of the rim being formed with an opening and the other end of the rim having a button to engage in such opening, the contiguous ends of the rim being also provided each with a lip to be engaged by a tool for drawing the ends of the rim together.

4. An attachment for wheels having yielding tires, the attachment comprising a strap adapted to encircle the tire of the wheel, and spurs mounted to slide in the strap radially of the wheel, the spurs engaging the tire of the wheel to be normally pressed outward thereby, and being capable of moving inward upon the yielding of the tire.

5. An attachment for wheels having flexible tires, the attachment comprising a strap adapted to encircle the tire, and spurs fitted to slide in the strap radially of the wheel and formed at their ends with heads lying against the tire, the tire normally throwing the spurs outward and the spurs being movable inward upon the yielding of the tire.

In testimony whereof I have signed my name to this specification in the presence of two subscribing witnesses.

DIETRICH WILLIAM TIETJEN.

Witnesses:
WILLIAM LEINER,
AUG. SONNEMANN.